US012493589B2

(12) United States Patent
Nimmala et al.

(10) Patent No.: US 12,493,589 B2
(45) Date of Patent: Dec. 9, 2025

(54) EFFICIENT CONSTRUCTION AND QUERYING PROGRESS OF A CONCURRENT MIGRATION

(71) Applicant: Dell Products L.P., Round Rock, TX (US)

(72) Inventors: Sumith Chandra Reddy Nimmala, Lake Stevens, WA (US); Grigorii Skripko, Snohomish, WA (US); John Abercrombie, Seattle, WA (US)

(73) Assignee: Dell Products L.P., Round Rock, TX (US)

( * ) Notice: Subject to any disclaimer, the term of this patent is extended or adjusted under 35 U.S.C. 154(b) by 64 days.

(21) Appl. No.: 18/633,468

(22) Filed: Apr. 11, 2024

(65) Prior Publication Data

US 2025/0321938 A1   Oct. 16, 2025

(51) Int. Cl.
*G06F 16/21* (2019.01)
*G06F 16/22* (2019.01)

(52) U.S. Cl.
CPC ............ *G06F 16/214* (2019.01); *G06F 16/22* (2019.01)

(58) Field of Classification Search
CPC ................................ G06F 16/214; G06F 16/22
See application file for complete search history.

(56) References Cited

U.S. PATENT DOCUMENTS

2014/0081918 A1*  3/2014  Srivas ................. G06F 16/1727
707/639

* cited by examiner

*Primary Examiner* — Robert W Beausoliel, Jr.
*Assistant Examiner* — Mohammad S Bhuyan
(74) *Attorney, Agent, or Firm* — Amin, Turocy & Watson, LLP

(57) ABSTRACT

The system can divide a key address space of a first key-value store into a group of ranges. The system can initialize a group of processes to perform a migration in parallel, wherein respective processes maintain respective progress keys. The system can maintain a navigable map comprising pairs, wherein the pairs comprise respective starting keys of respective ranges of respective buckets, and respective buckets, and wherein the respective buckets comprise respective indications of the respective ranges and respective progress keys of the progress keys. The system can, in response to receiving a request to access a first value based on a first key, identify a first bucket from the navigable map and the first key, and in response to determining that a progress key of the progress keys of the first bucket is greater than or equal to the first key, access the first value in the second key-value store.

20 Claims, 16 Drawing Sheets

400

```
startKey = range.startKey
endKey = range.endKey for each bucket in ordered submap {
        if bucket contains entire range of startKey to endKey {
                if bucket is migrated for range including startKey and endKey {
                        return true;
                } else {
                        return false;
                }
        } else if bucket contains startKey {
                if bucket is not fully migrated {
                        return false;
                }
        } else if bucket contains endKey {
                if endKey is not migrated in bucket {
                        return false;
                }
        } else {
                if bucket is not migrated {
                        return false;
                }
        }
}
return true;
```

DETERMINING THAT THE PROGRESS KEY IS LESS THAN THE FIRST KEY 604

ATTEMPTING TO FIRST ACCESS THE FIRST VALUE IN THE SECOND KEY-VALUE STORE, AND WHERE THE FIRST KEY DOES NOT EXIST IN THE SECOND KEY-VALUE STORE, ACCESSING THE FIRST VALUE IN THE FIRST KEY-VALUE STORE 606

AS PART OF EXECUTING A MIGRATION FOR OBJECT STORAGE FROM A FIRST KEY-VALUE STORE TO A SECOND KEY-VALUE STORE, DIVIDING A KEY ADDRESS SPACE OF THE FIRST KEY-VALUE STORE INTO A GROUP OF RANGES, INITIALIZING A GROUP OF PROCESSES TO PERFORM THE MIGRATION CONCURRENTLY, WHEREIN RESPECTIVE PROCESSES OF THE GROUP OF PROCESSES HAVE RESPECTIVE RANGES OF THE RANGES, AND WHEREIN THE RESPECTIVE PROCESSES MAINTAIN RESPECTIVE PROGRESS KEYS THAT RESPECTIVELY INDICATE HOW MUCH OF THE RESPECTIVE RANGES HAVE BEEN MIGRATED BY THE RESPECTIVE PROCESSES 804

↓

MAINTAINING A NAVIGABLE MAP COMPRISING PAIRS, WHEREIN THE PAIRS COMPRISE RESPECTIVE STARTING KEYS OF RESPECTIVE RANGES OF RESPECTIVE BUCKETS AND RESPECTIVE BUCKETS, WHEREIN THE RESPECTIVE BUCKETS COMPRISE RESPECTIVE INDICATIONS OF THE RESPECTIVE RANGES AND RESPECTIVE PROGRESS KEYS OF THE PROGRESS KEYS 806

↓

IN RESPONSE TO RECEIVING A REQUEST TO ACCESS A FIRST VALUE BASED ON A FIRST KEY, IDENTIFYING A FIRST BUCKET OF THE BUCKETS FROM THE NAVIGABLE MAP AND THE FIRST KEY, WHEREIN THE FIRST BUCKET CORRESPONDS TO A RANGE OF THE RANGES THAT CONTAINS THE FIRST KEY 808

↓

IN RESPONSE TO DETERMINING WHETHER A PROGRESS KEY OF THE PROGRESS KEYS OF THE FIRST BUCKET IS GREATER THAN OR EQUAL TO THE FIRST KEY, DETERMINING A SELECTED KEY-VALUE STORE FROM THE FIRST KEY-VALUE STORE AND THE SECOND KEY-VALUE STORE 810

↓

ACCESSING THE FIRST VALUE IN THE SELECTED KEY-VALUE STORE 812

MAINTAINING A THIRD KEY-VALUE STORE 1104

↓

UTILIZING THE RESPECTIVE STARTING KEYS AS RESPECTIVE KEYS TO THE THIRD KEY-VALUE STORE 1106

↓

UTILIZING THE RESPECTIVE BUCKETS AS RESPECTIVE VALUES TO THE THIRD KEY-VALUE STORE 1108

DETERMINING, FROM THE FIRST KEY, A GREATEST KEY STORED IN THE THIRD KEY-VALUE STORE THAT IS LESS THAN OR EQUAL TO THE FIRST KEY
1304

IDENTIFYING THE FIRST BUCKET BASED ON THE GREATEST KEY 1306

```
    (1502)
       │
       ▼
┌─────────────────────────────────────────────────────────────────┐
│ RECEIVING A QUERY THAT INDICATES DETERMINING WHETHER A RANGE OF │
│   KEYS IS MIGRATED TO THE SECOND KEY-VALUE STORE 1504           │
└─────────────────────────────────────────────────────────────────┘
       │
       ▼
┌─────────────────────────────────────────────────────────────────┐
│  DETERMINING THAT THE RANGE OF KEYS IS MIGRATED BASED ON        │
│ DETERMINING, FOR EACH BUCKET OF THE SUBMAP OF BUCKETS, THAT KEYS│
│        OF THE BUCKET HAVE BEEN MIGRATED 1506                    │
└─────────────────────────────────────────────────────────────────┘
       │
       ▼
    (1508)
```

FIG. 15

EFFICIENT CONSTRUCTION AND QUERYING PROGRESS OF A CONCURRENT MIGRATION

BACKGROUND

A key-value store can store pairs that comprise a key that can be used to identify a pair, and a corresponding value.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can initiate a migration for object storage from a first key-value store to a second key-value store. The system can divide a key address space of the first key-value store into a group of ranges, wherein the ranges of the group of ranges are continuous and nonoverlapping, and wherein the key address space is ordered based on respective key values. The system can initialize a group of processes to perform the migration in parallel, wherein respective processes of the group of processes have respective ranges of the ranges, and wherein the respective processes maintain respective progress keys that respectively indicate how much of the respective ranges have been migrated by the respective processes. The system can maintain a navigable map comprising pairs, wherein the pairs comprise respective starting keys of respective ranges of respective buckets, and respective buckets, and wherein the respective buckets comprise respective indications of the respective ranges and respective progress keys of the progress keys. The system can, in response to receiving a request to access a first value based on a first key, identify a first bucket of the respective buckets from the navigable map and the first key, wherein the first bucket corresponds to a range of the ranges that encompasses the first key, and in response to determining that a progress key of the progress keys of the first bucket is greater than or equal to the first key, access the first value in the second key-value store.

An example method can comprise, as part of executing a migration for object storage from a first key-value store to a second key-value store, dividing, by a system comprising at least one processor, a key address space of the first key-value store into a group of ranges. The method can further comprise initializing, by the system, a group of processes to perform the migration concurrently, wherein respective processes of the group of processes have respective ranges of the ranges, and wherein the respective processes maintain respective progress keys that respectively indicate how much of the respective ranges have been migrated by the respective processes. The method can further comprise maintaining, by the system, a navigable map comprising pairs, wherein the pairs comprise respective starting keys of respective ranges of respective buckets and respective buckets, wherein the respective buckets comprise respective indications of the respective ranges and respective progress keys of the progress keys. The method can further comprise, in response to receiving a request to access a first value based on a first key, identifying, by the system, a first bucket of the buckets from the navigable map and the first key, wherein the first bucket corresponds to a range of the ranges that contains the first key. The method can further comprise, in response to determining whether a progress key of the progress keys of the first bucket is greater than or equal to the first key, determining, by the system, a selected key-value store from the first key-value store and the second key-value store. The method can further comprise accessing, by the system, the first value in the selected key-value store.

An example non-transitory computer-readable medium can comprise instructions that, in response to execution, cause a system comprising a processor to perform operations. These operations can comprise, as part of a migration for object storage from a first key-value store to a second key-value store, dividing a key address space of first key-value store into a group of ranges. These operations can further comprise initializing a group of processes to perform the migration in parallel, wherein respective processes of the group of processes have respective ranges of the group of ranges, and wherein the respective processes maintain respective progress keys that respectively indicate how much of the respective ranges have been migrated by the respective processes. These operations can further comprise maintaining a third key-value store comprising pairs, wherein the pairs comprise respective starting keys of respective ranges of respective buckets, and respective buckets, wherein the respective buckets comprise respective indications of the respective ranges and respective progress keys of the progress keys. These operations can further comprise, in response to receiving a request to access a first value based on a first key, identifying a first bucket of the buckets from the third key-value store and the first key, wherein the first bucket corresponds to a range of the ranges that encompasses the first key. These operations can further comprise, in response to determining whether a progress key of the progress keys of the first bucket is greater than or equal to the first key, determining a selected key-value store from the first key-value store and the second key-value store. These operations can further comprise accessing the first value in the selected key-value store.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 4 illustrates example pseudo code that can facilitate multi-threaded migration, in accordance with an embodiment of this disclosure;

FIG. 6 illustrates another example process flow that can facilitate multi-threaded migration, in accordance with an embodiment of this disclosure;

FIG. 8 illustrates another example process flow that can facilitate multi-threaded migration, in accordance with an embodiment of this disclosure;

FIG. 11 illustrates another example process flow that can facilitate multi-threaded migration, in accordance with an embodiment of this disclosure;

FIG. 13 illustrates another example process flow that can facilitate multi-threaded migration, in accordance with an embodiment of this disclosure;

FIG. 15 illustrates another example process flow that can facilitate multi-threaded migration, in accordance with an embodiment of this disclosure;

DETAILED DESCRIPTION

Overview

Prior approaches to object storage can utilize a key-value (KV) store, which can be referred to as a legacy KV store. There can be object storage implementations that use a KV store, which can be referred to as a new KV store, which is faster and lightweight, compared to the legacy KV store. Where KV stores in object storage are used to store root-level information, it can be that it is desired to perform a migration between KV stores without downtime of the associated object storage.

According to the present techniques, migrating KV pairs between KV stores can be performed online while actively serving requests on object storage. An existence of two concurrent KV stores can increase an overhead associated with querying both stores to serve requests, which can cause higher system resource usage and higher latency for requests, compared with using one KV store.

The present techniques can be implemented to mitigate an issue of resource usage and latency associated with KV store migration by facilitating an efficient and effective mechanism to determine whether a key or set of keys has/have been migrated. This can be effectuated with a migration progress map, which can reduce an overhead of querying two KV stores for incoming requests by providing the migration status of the keys.

According to the present techniques, data structures can be constructed, and supporting operations provided, to speed-up queries during a key-value store migration in object storage. The present techniques can provide an efficient approach to construct a multi-threaded migration process that scales.

Example Architectures, Etc.

Figure 1:
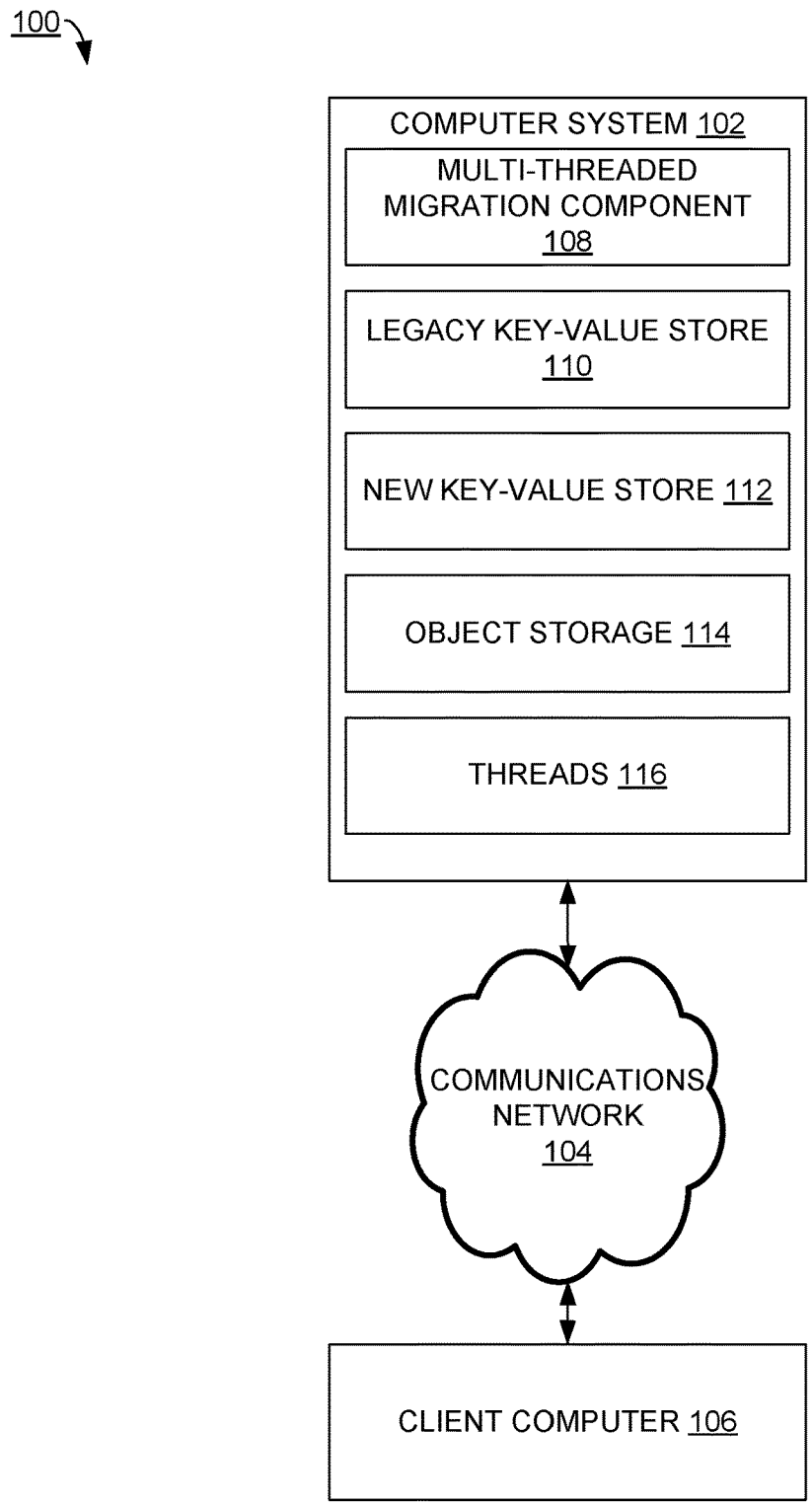
FIG. 1 illustrates an example system architecture that can facilitate multi-threaded migration, in accordance with an embodiment of this disclosure.

FIG. 1 illustrates an example system architecture 100 that can facilitate multi-threaded migration, in accordance with an embodiment of this disclosure.

System architecture 100 comprises computer system 102, communications network 104, and client computer 106. In turn, computer system 102 comprises multi-threaded migration component 108, legacy key-value store 110, new key-value store 112, object storage 114, and threads 116.

System architecture 100 presents one logical example of implementing the present techniques, and it can be appreciated that there can be other example architectures.

Figure 16:
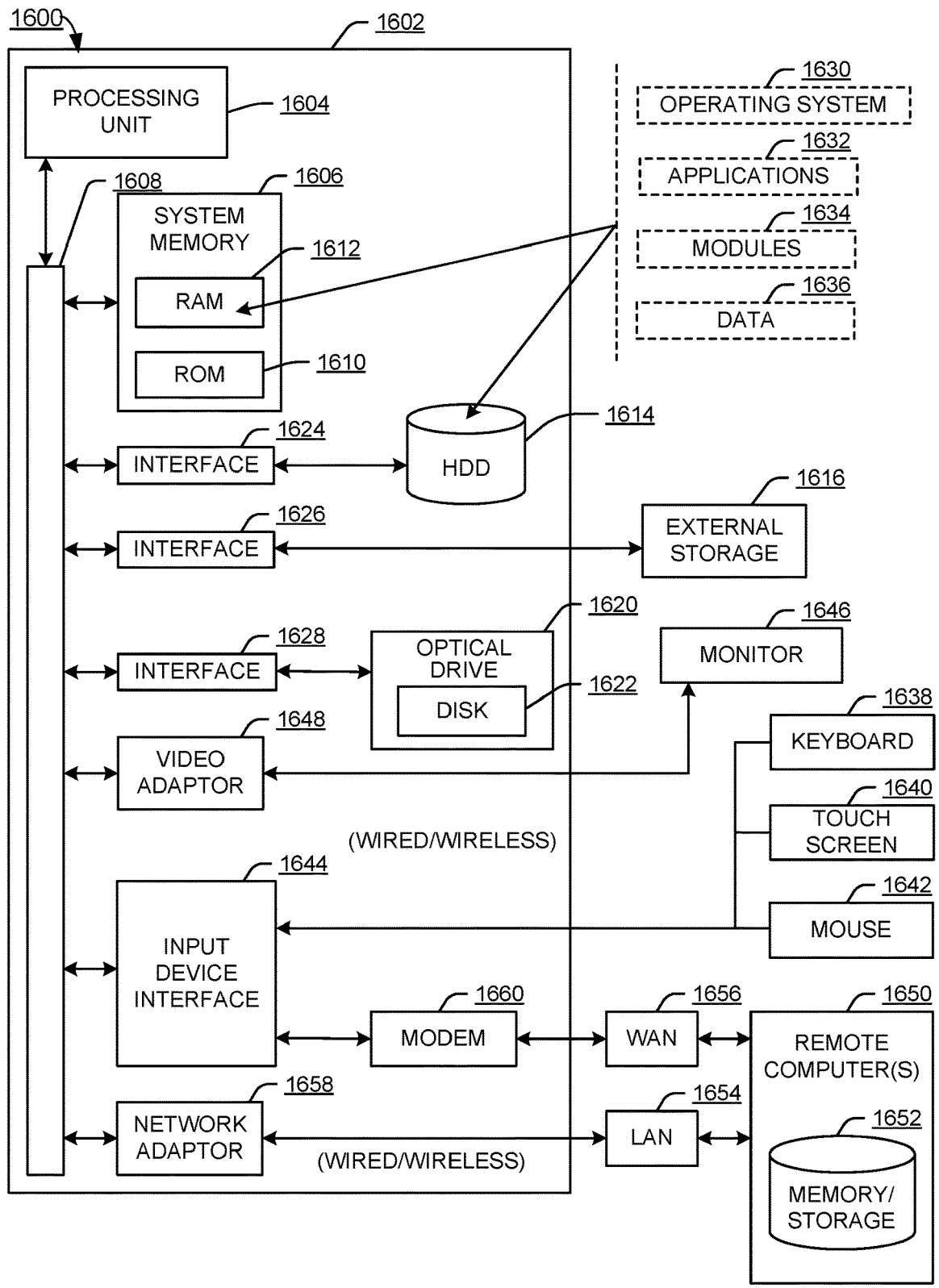
FIG. 16 illustrates an example block diagram of a computer operable to execute an embodiment of this disclosure.

Each of computer system 102 and/or client computer 106 can be implemented with part(s) of computing environment 1600 of FIG. 16. Communications network 104 can comprise a computer communications network, such as the Internet, or an intranet.

In some examples, multi-threaded migration component 108 can facilitate migrating from using legacy key-value store 110 to serve requests from client computer 106 to access object storage 114, to using new key-value store 112 to serve requests from client computer 106 to access object storage 114.

The migration can be effectuated in parallel by dividing the key range of legacy key-value store 110 into multiple buckets, and then having different threads of threads 116 each migrate a bucket to new key-value store 112. A thread can be referred to as a thread of execution, and can comprise a part of code with state memory that can be scheduled on a processor by a scheduler.

In some examples, multi-threaded migration component 108 can implement part(s) of process flows of FIGS. 5-15 to implement multi-threaded migration.

It can be appreciated that system architecture 100 is one example system architecture for multi-threaded migration, and that there can be other system architectures that facilitate multi-threaded migration.

Figure 2:
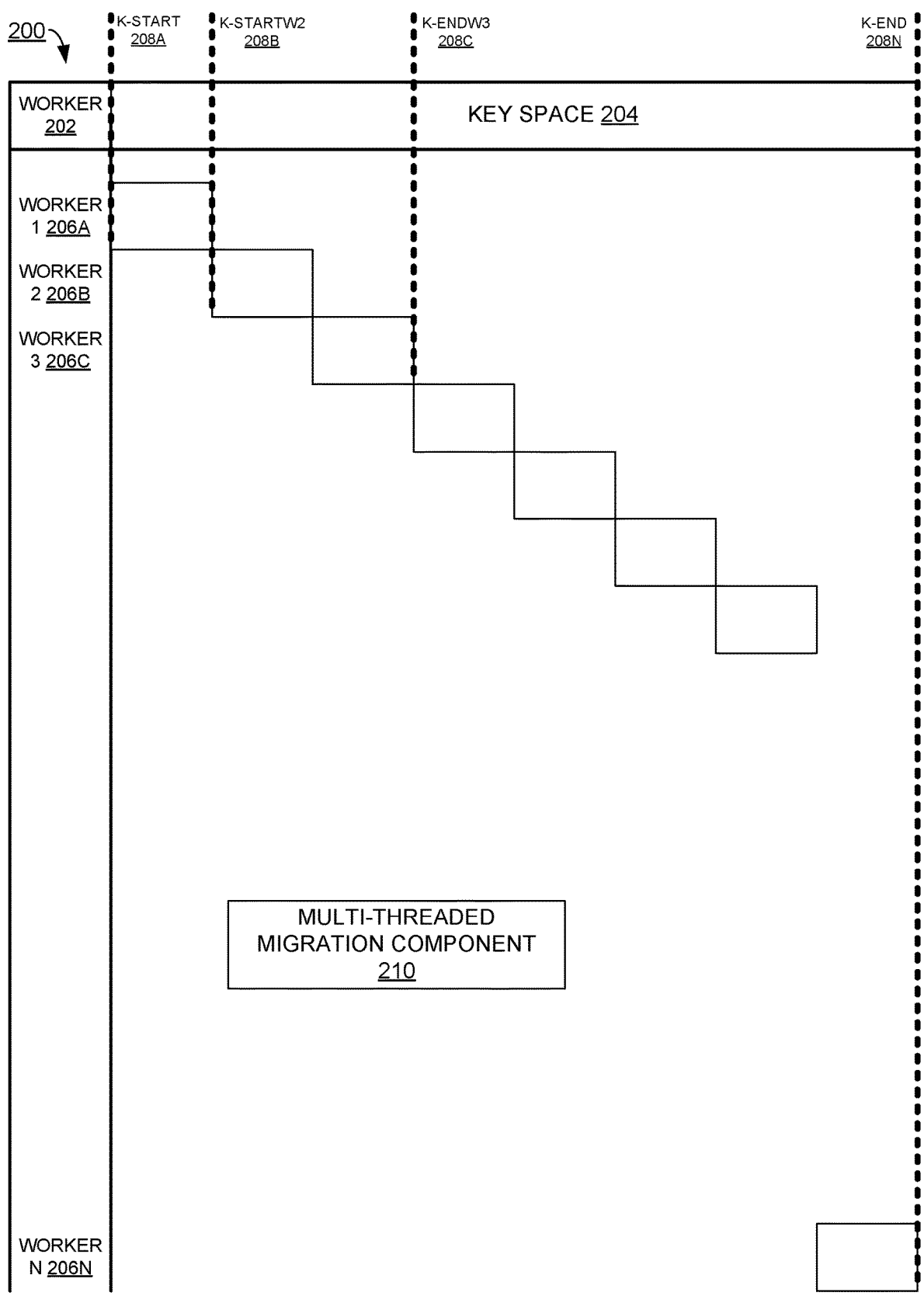
FIG. 2 illustrates an example key space partition, and that can facilitate multi-threaded migration, in accordance with an embodiment of this disclosure.

FIG. 2 illustrates an example key space partition 200, and that can facilitate multi-threaded migration, in accordance with an embodiment of this disclosure. In some examples, part(s) of key space partition 200 can be used by part(s) of system architecture 100 of FIG. 1 to facilitate multi-threaded migration.

Key space partition 200 comprises worker 202, key space 204, worker 1 206A, worker 2 206B, worker 3 206C, worker N 206N, K-start 208A, K-startW2 208B, K-endW3 208C, K-end 208N, and multi-threaded migration component 210 (which can be similar to multi-threaded migration component 108 of FIG. 1).

In some examples, the present techniques can be implemented as follows. A key space can be the total keys on a KV store. Keys can be ordered based on a defined comparison logic. It can be that the legacy KV store does not accept new write operations once migration starts, so the key space can remain intact after a migration initializes. [K-start, K-end] can be an entire key space range for migration, where keys K-start <K-end.

A migration worker can list keys from K-start to K-end, and write them to the new KV store, while periodically updating the progress. The migration worker can hold a start key (K-start), progress key (K-progress), and end key (K-end). Given that, checking whether a key, K-x, is migrated to the new KV store can be a constant-time operation. The operation can be checking if (K-progress>=K-x). If Yes, then K-x is migrated, and otherwise it has not been migrated.

To check if a range is migrated can also be a constant operation. That is, if (K-progress>=range.startkey and K-progress>=range.endkey), then Yes.

A progress key check can be implemented to determine whether a particular key has been migrated. Where it is determined that the key has been migrated, it can be that only the new key-value store is queried. If the key has not been migrated, then it can be that both the legacy and new key-value stores are queried.

Determining migration status can involve comparing a progress key to a request key. If the progress key>=request key, then the key is migrated, and a check can be made only in the new-key value store. If the progress key<request key, it can be determined that the key is not migrated, and it can be that both the legacy and new key-value stores need to be checked.

Where a migration can be performed by multiple migration workers (each comprising a thread), these operations can be extended via parallelization. It can be that N migration workers are configured to perform a migration in parallel. The entire key space can be divided into N continuous, non-overlapping partitions. Each worker can have its own partition to work upon.

An example split and allocation of portions is illustrated in FIG. 2. In this example, K-start 208A and K-end 208N are the first key (K-start 208A) and last key (K-end 208N) of the key space.

The workers are Worker 1 206A: [K-startW1, K-endW1], Worker 2 206B: [K-startW2, K-endW2], . . . , Worker N 206N: [K-startWn, K-endWn].

In addition to keys that specify a partition range, workers can maintain a progress key that indicates a last key the worker successfully migrated. The partition range keys together with the progress key can be referred to as a bucket.

Workers can update their progress key after each iteration of listing. A migration progress updater can pick a latest state of each worker periodically, and persist it in the KV store, so it can be fetched easily to be used elsewhere.

Buckets can be assembled in a structured way from the migration progress. Migration progress can be a navigable map constructed using a start key of a bucket as the key and the bucket as a value. Then, a navigable map can hold a total of N entries (corresponding to N workers). A map entry can comprise a pair of <Bucket.StartKey, Bucket>.

There can be other services in an object storage system that interact with KV stores using a KV client. A KV client can store an instance of a migration progress map that is constructed by fetching a key persisted as described above with respect to the migration progress updater, and structure the key as <Bucket.StartKey, Bucket>. This map can be refreshed periodically to hold a latest state.

A migration progress can support a get floor entry operation, which can return a greatest key from a map that is less than or equal to the query key. This can be performed in O(log (N)) time (in Big O notation), where N is the total number of workers, and also the total number of buckets in the data structure. Workers and buckets can hold onto a one-to-one mapping.

Then, to determine whether a key is migrated, a KV client can invoke a migration progress get floor operation for a query key, which can return a bucket the query key belongs to. Then, the progress key of the bucket can be compared to the query key to determine whether it has been migrated. The KV client can then fetch the key from the new KV store if migrated, or the legacy KV store otherwise.

Figure 3:
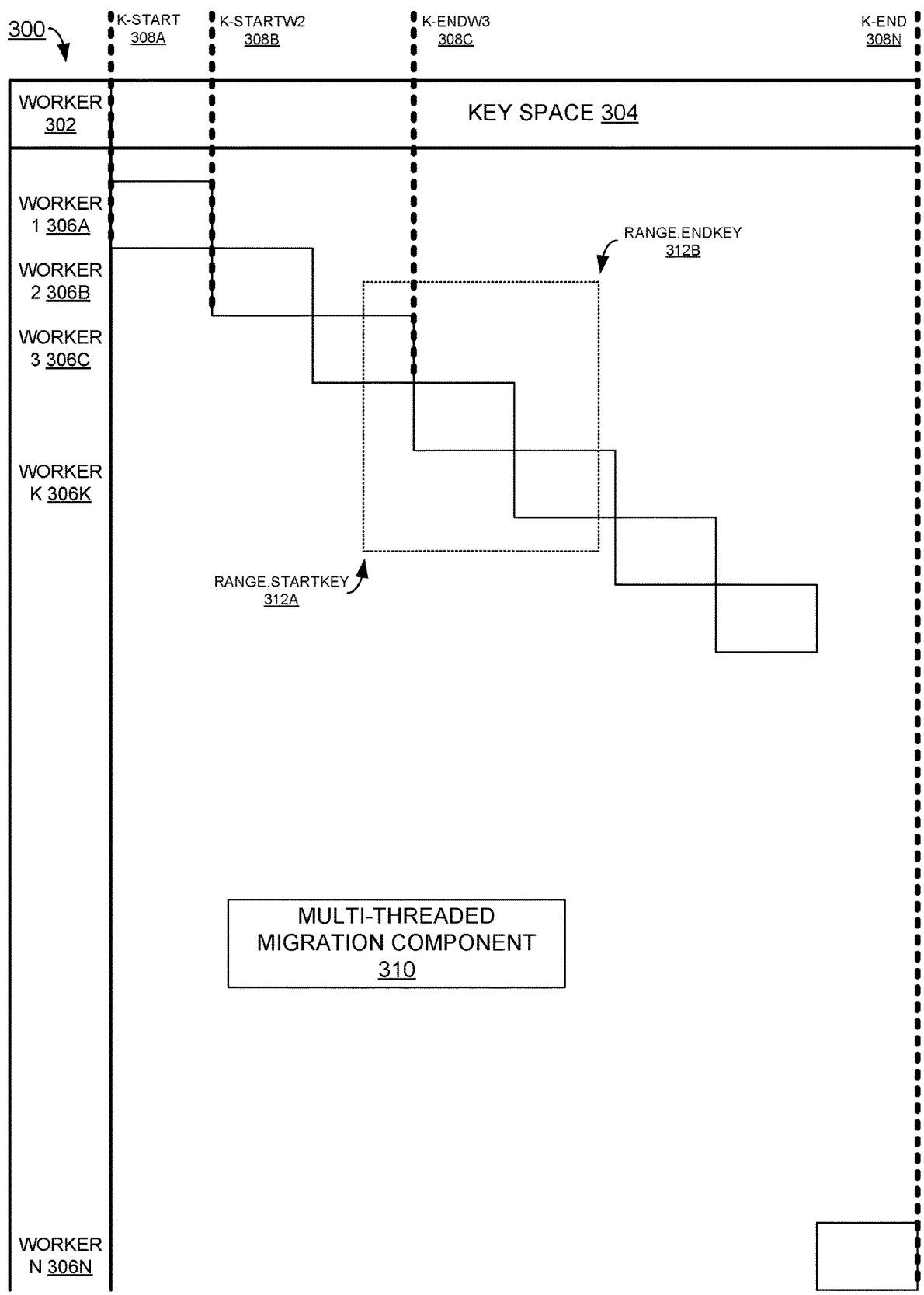
FIG. 3 illustrates an example range query on a key space partition, and that can facilitate multi-threaded migration, in accordance with an embodiment of this disclosure.

FIG. 3 illustrates an example range query on a key space partition 300, and that can facilitate multi-threaded migration, in accordance with an embodiment of this disclosure. In some examples, part(s) of key space partition 300 can be used by part(s) of system architecture 100 of FIG. 1 to facilitate multi-threaded migration.

Key space partition 300 comprises worker 302, key space 304, worker 1 306A, worker 2 306B, worker 3 306C, worker K 308K, worker N 306N, K-start 308A, K-startW2 308B, K-endW3 308C, K-end 308N, multi-threaded migration component 310 (which can be similar to multi-threaded migration component 108 of FIG. 1), range.startkey 312A, and range.endkey 312B.

In some examples, worker 302, key space 304, worker 1 306A, worker 2 306B, worker 3 306C, worker N 306N, K-start 308A, K-startW2 308B, K-endW3 308C, K-end 308N, and multi-threaded migration component 310 can be similar to worker 202, key space 204, worker 1 206A, worker 2 206B, worker 3 206C, worker N 206N, K-start 208A, K-startW2 208B, K-endW3 208C, K-end 208N, and multi-threaded migration component 210 of FIG. 2, respectively.

Between FIG. 2 and FIG. 3, worker K 308K, range.startkey 312A, and range.endkey 312B can be newly depicted in FIG. 3.

A migration progress can also return a submap of all overlapping buckets for a range query. FIG. 3 demonstrates how overlapping buckets can be determined; it can return a submap that includes [Bucket 3, Bucket K] for a range query.

Given this, to query for a range, a KV client can invoke a migration progress to get submap operation, with a start and end key of the query range, which can return the buckets of interest in an ordered fashion, and then each bucket can be sequentially queried in constant time to determine whether the range is migrated.

In some examples, query range can fall into one of the following categories:

The entire query range is part of one bucket. That can be the above check of, if (K-progress>=range.startkey and K-progress>=range.endkey), then Yes.

The query range intersects multiple buckets. It can be that query range is migrated only if the overlapping range of each intersecting bucket in the submap is migrated. This can be performed within O(log (N)+M) time, where N is total number of buckets, and M is the size of the buckets that intersect the range.

FIG. 4 illustrates example pseudo code 400 that can facilitate multi-threaded migration, in accordance with an embodiment of this disclosure. In some examples, part(s) of pseudo code 400 can be used by part(s) of system architecture 100 of FIG. 1 to facilitate multi-threaded migration.

FIG. 4 illustrates example pseudo code that can be used by a KV client to determine whether a range is migrated. If the range is not migrated, the KV client can merge range query output from both KV stores, and construct its final response.

---

Example pseudo code 400 is:
```
startKey = range.startKey
endKey = range.endKey
for each bucket in ordered submap {
        if bucket contains entire range of startKey to endKey {
                if bucket is migrated for range including startKey
and endKey {
                        return true;
                } else {
                        return false;
                }
        } else if bucket contains startKey {
                if bucket is not fully migrated {
                        return false;
                }
        } else if bucket contains endKey {
```

-continued

```
            if endKey is not migrated in bucket {
                return false;
            }
        } else {
            if bucket is not migrated {
                return false;
            }
        }
    }
    return true;
```

Example Process Flows

Figure 5:
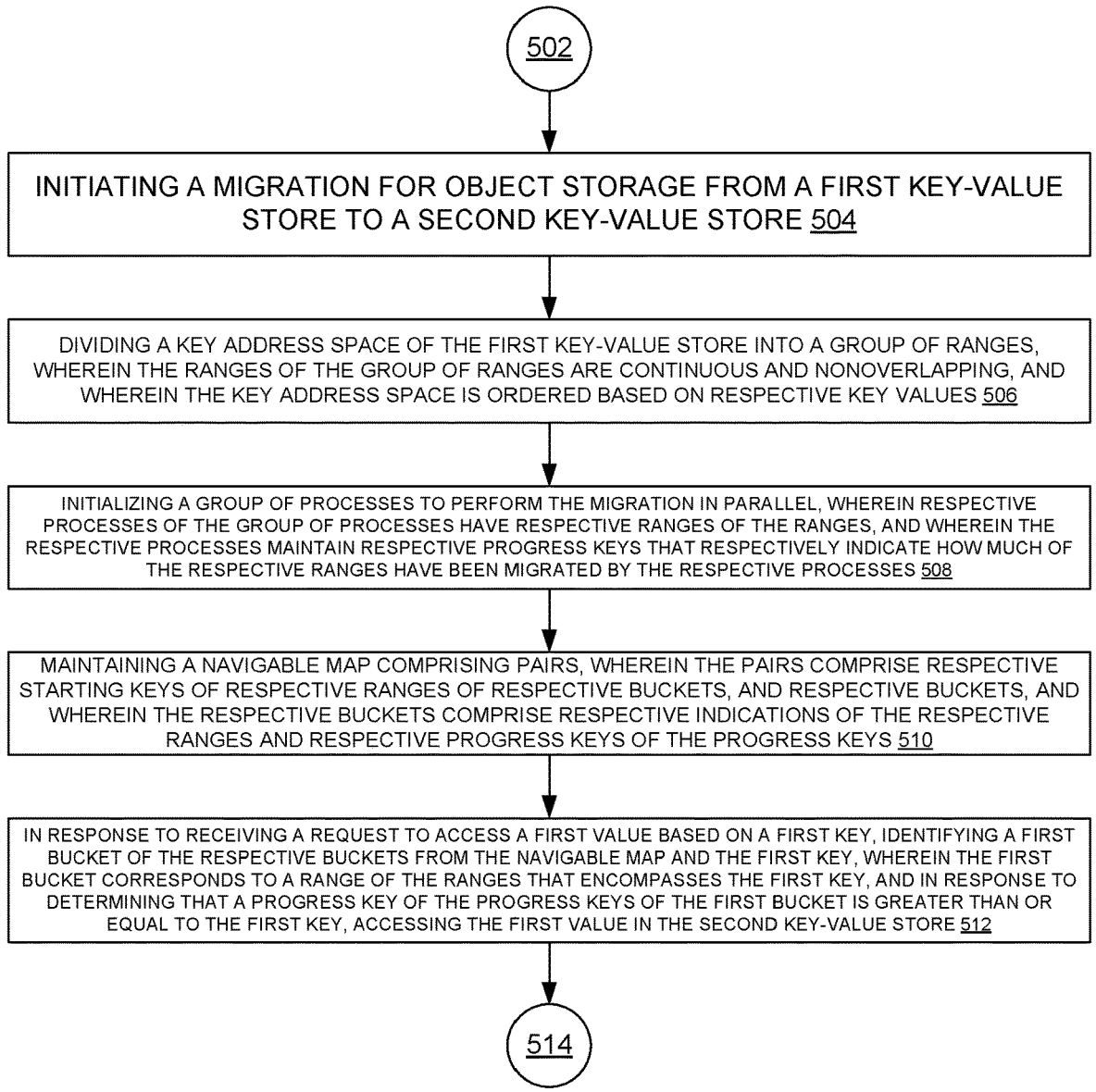
FIG. 5 illustrates an example process flow that can facilitate multi-threaded migration, in accordance with an embodiment of this disclosure.

FIG. 5 illustrates an example process flow 500 that can facilitate multi-threaded migration, in accordance with an embodiment of this disclosure. In some examples, one or more embodiments of process flow 500 can be implemented by multi-threaded migration component 108 of FIG. 1, or computing environment 1600 of FIG. 16.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 600 of FIG. 6, process flow 700 of FIG. 7, process flow 800 of FIG. 8, process flow 900 of FIG. 9, process flow 1000 of FIG. 10, process flow 1100 of FIG. 11, process flow 1200 of FIG. 12, process flow 1300 of FIG. 13, process flow 1400 of FIG. 14, and/or process flow 1500 of FIG. 15.

Process flow 500 begins with 502, and moves to operation 504.

Operation 504 depicts initiating a migration for object storage from a first key-value store to a second key-value store. Using the example of FIG. 1, the migration can be from legacy key-value store 110 to new key-value store 112.

After operation 504, process flow 500 moves to operation 506.

Operation 506 depicts dividing a key address space of the first key-value store into a group of ranges, wherein the ranges of the group of ranges are continuous and nonoverlapping, and wherein the key address space is ordered based on respective key values. These can be similar to the ranges of FIG. 2.

After operation 506, process flow 500 moves to operation 508.

Operation 508 depicts initializing a group of processes to perform the migration in parallel, wherein respective processes of the group of processes have respective ranges of the ranges, and wherein the respective processes maintain respective progress keys that respectively indicate how much of the respective ranges have been migrated by the respective processes. That is, different processor threads can migrate the different ranges from legacy key-value store 110 to new key-value store 112 (using the example of FIG. 1).

In some examples, respective processes of the group of processes each migrate a different respective range of the respective ranges. That is, there can be N migration workers that are configured to run migration in parallel, where a key space is divided into N continuous non-overlapping partitions. Each migration worker can have its own partition to work on.

In some examples, the respective progress keys indicate a last key that was successfully migrated by a corresponding process of the group of processes. That is, each worker can have a progress key that indicates a last key that that process successfully migrated.

In some examples, respective processes of the group of processes perform iterations of listing keys from the first key-value store, and wherein performing the iterations of listing keys comprises updating the respective progress keys after the respective iterations of listing keys. That is, workers can update their progress key after each iteration of listing.

In some examples, operation 508 comprises periodically performing iterations of persisting respective states of the respective processes to the second key-value store, comprising using a process that is separate from the respective processes, wherein respective iterations of the listing keys correspond to respective iterations of the persisting. That is, a migration progress updater can pick a latest state of each worker periodically, and persist it in a key value store, so that it can be fetched to be used elsewhere. Listing and persisting can be performed sequentially. That is, it can be that an iteration of persisting can be performed after an iteration of listing.

After operation 508, process flow 500 moves to operation 510.

Operation 510 depicts maintaining a navigable map comprising pairs, wherein the pairs comprise respective starting keys of respective ranges of respective buckets, and respective buckets, and wherein the respective buckets comprise respective indications of the respective ranges and respective progress keys of the progress keys. That is, while performing the migration, a navigable map comprising entries, where entries are a pair of <Bucket.StartKey, Bucket>, can be maintained.

After operation 510, process flow 500 moves to operation 512.

Operation 512 depicts, in response to receiving a request to access a first value based on a first key, identifying a first bucket of the respective buckets from the navigable map and the first key, wherein the first bucket corresponds to a range of the ranges that encompasses the first key, and in response to determining that a progress key of the progress keys of the first bucket is greater than or equal to the first key, accessing the first value in the second key-value store. That is, where there is a request to access a value, and it has been determined that the corresponding key-value pair has already been migrated from legacy key-value store 110 to new key-value store 112 (using the example of FIG. 1), this request can be serviced from new key-value store 112.

After operation 512, process flow 500 moves to 514, where process flow 500 ends.

FIG. 6 illustrates an example process flow 600 that can facilitate multi-threaded migration, in accordance with an embodiment of this disclosure. In some examples, one or more embodiments of process flow 600 can be implemented by multi-threaded migration component 108 of FIG. 1, or computing environment 1600 of FIG. 16.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 500 of FIG. 5, process flow 700 of FIG. 7, process flow 800 of FIG. 8, process flow 900 of FIG. 9, process flow 1000 of FIG. 10, process flow 1100 of FIG. 11, process flow 1200 of FIG. 12, process flow 1300 of FIG. 13, process flow 1400 of FIG. 14, and/or process flow 1500 of FIG. 15.

Process flow 600 begins with 602, and moves to operation 604.

Operation 604 depicts determining that the progress key is less than the first key. That is, during a migration, it can be determined that a particular key requested (the first key) has not yet been migrated from legacy key-value store 110 to new key-value store 112 (using the example of FIG. 1).

After operation 604, process flow 600 moves to operation 606.

Operation 606 depicts attempting to first access the first value in the second key-value store, and where the first key does not exist in the second key-value store, accessing the first value in the first key-value store. Where a particular key requested (the first key) has not yet been migrated from legacy key-value store 110 to new key-value store 112 (using the example of FIG. 1), then the request can be served from legacy key-value store 110 or new key-value store 112.

In some examples, the request can be checked on both key-value stores. There can be a possibility that the key is updated, and new updates for the key after a migration starts are on the new key-value store.

Put another way, where a key is not migrated yet, it can be that both key-value stores need to be checked. Where there was an update for a key that is not migrated, there can be old state on the legacy key-value store and a latest state on the new key-value store. An approach can be to first check the new key-value store, and where there is that latest state use it; then, otherwise use the legacy key-value store.

If there has been no update for a key that is not migrated, there can be one state for the key and that can be on the legacy key-value store. However, determining whether there was an update can be made based on checking the new key-value store. That is, the new key-value store can be checked and the key not found. Then, the legacy key-value store can be checked, and if the key is found, return the value.

After operation 606, process flow 600 moves to 608, where process flow 600 ends.

Figure 7:
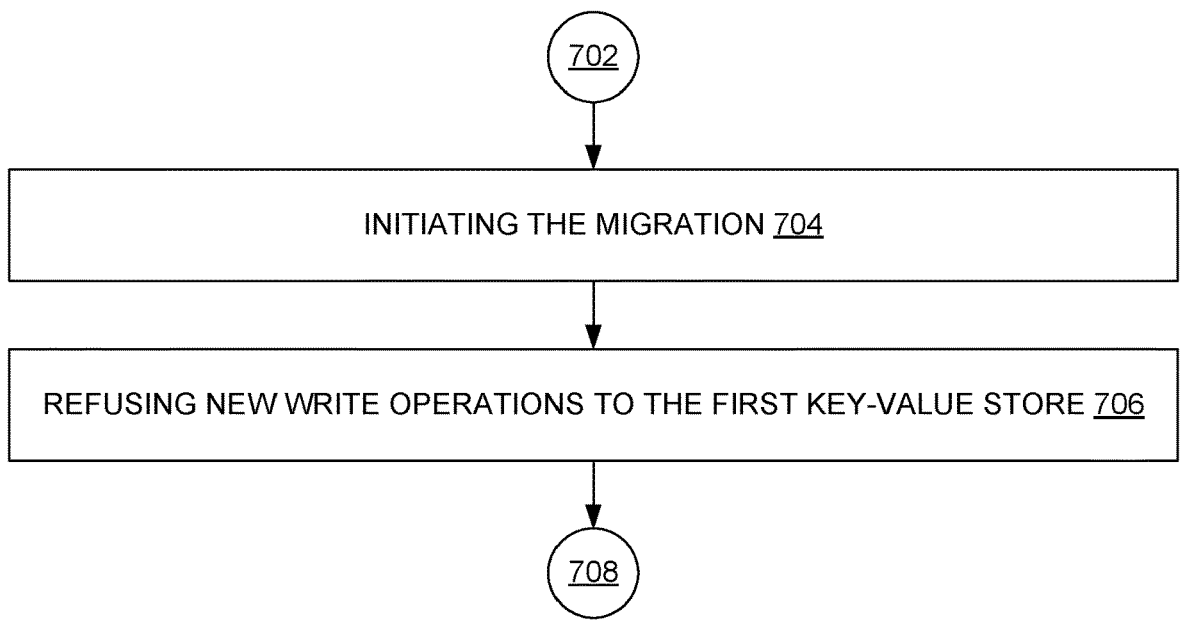
FIG. 7 illustrates another example process flow that can facilitate multi-threaded migration, in accordance with an embodiment of this disclosure.

FIG. 7 illustrates an example process flow 700 that can facilitate multi-threaded migration, in accordance with an embodiment of this disclosure. In some examples, one or more embodiments of process flow 700 can be implemented by multi-threaded migration component 108 of FIG. 1, or computing environment 1600 of FIG. 16.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 500 of FIG. 5, process flow 600 of FIG. 6, process flow 800 of FIG. 8, process flow 900 of FIG. 9, process flow 1000 of FIG. 10, process flow 1100 of FIG. 11, process flow 1200 of FIG. 12, process flow 1300 of FIG. 13, process flow 1400 of FIG. 14, and/or process flow 1500 of FIG. 15.

Process flow 700 begins with 702, and moves to operation 704.

Operation 704 depicts initiating the migration. Using the example of FIG. 1, this can be a migration from legacy key-value store 110 to new key-value store 112.

After operation 704, process flow 700 moves to operation 706.

Operation 706 depicts refusing new write operations to the first key-value store. The first key-value store can be legacy key-value store 110, and once a migration to new key-value store 112 begins, new write operations to legacy key-value store 110 can be refused.

After operation 706, process flow 700 moves to 708, where process flow 700 ends.

FIG. 8 illustrates an example process flow 800 that can facilitate multi-threaded migration, in accordance with an embodiment of this disclosure. In some examples, one or more embodiments of process flow 800 can be implemented by multi-threaded migration component 108 of FIG. 1, or computing environment 1600 of FIG. 16.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 500 of FIG. 5, process flow 600 of FIG. 6, process flow 700 of FIG. 7, process flow 900 of FIG. 9, process flow 1000 of FIG. 10, process flow 1100 of FIG. 11, process flow 1200 of FIG. 12, process flow 1300 of FIG. 13, process flow 1400 of FIG. 14, and/or process flow 1500 of FIG. 15.

Process flow 800 begins with 802, and moves to operation 804.

Operation 804 depicts, as part of executing a migration for object storage from a first key-value store to a second key-value store, dividing, by a system comprising at least one processor, a key address space of the first key-value store into a group of ranges, initializing a group of processes to perform the migration concurrently, wherein respective processes of the group of processes have respective ranges of the ranges, and wherein the respective processes maintain respective progress keys that respectively indicate how much of the respective ranges have been migrated by the respective processes. In some examples, operation 804 can be implemented in a similar manner as operations 504-508 of FIG. 5.

After operation 804, process flow 800 moves to operation 806.

Operation 806 depicts maintaining a navigable map comprising pairs, wherein the pairs comprise respective starting keys of respective ranges of respective buckets and respective buckets, wherein the respective buckets comprise respective indications of the respective ranges and respective progress keys of the progress keys. In some examples, operation 806 can be implemented in a similar manner as operation 510 of FIG. 5.

In some examples, a first number of entries of the navigable map is equal to a second number of ranges in the group of ranges. That is, a navigable map can hold a total of N entries for N ranges.

In some examples, operation 806 comprises creating an instance of the navigable map that is accessible by a key-value client process. In some examples, operation 806 comprises periodically refreshing the instance of the navigable map. That is, services can interact with key-value stores using a key-value client. A key-value client can hold an instance of the navigable map that is constructed by fetching a persisted key and structuring it. This navigable map can be periodically refreshed to hold a latest state.

After operation 806, process flow 800 moves to operation 808.

Operation 808 depicts, in response to receiving a request to access a first value based on a first key, identifying a first bucket of the buckets from the navigable map and the first key, wherein the first bucket corresponds to a range of the ranges that contains the first key. In some examples, operation 808 can be implemented in a similar manner as operation 512 of FIG. 5.

After operation 808, process flow 800 moves to operation 810.

Operation 810 depicts, in response to determining whether a progress key of the progress keys of the first bucket is greater than or equal to the first key, determining a selected key-value store from the first key-value store and the second key-value store. In some examples, operation 810 can be implemented in a similar manner as operation 512 of FIG. 5.

After operation 810, process flow 800 moves to operation 812.

Operation 812 depicts accessing the first value in the selected key-value store. In some examples, operation 812 can be implemented in a similar manner as operation 512 of FIG. 5.

After operation 812, process flow 800 moves to 814, where process flow 800 ends.

Figure 9:
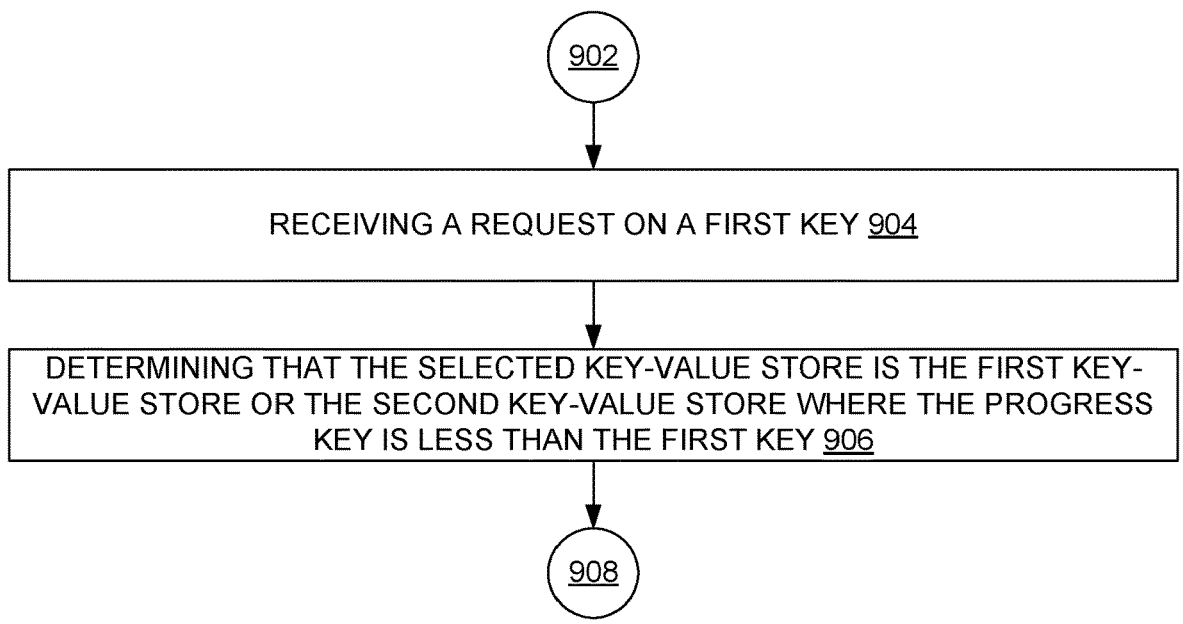
FIG. 9 illustrates another example process flow that can facilitate multi-threaded migration, in accordance with an embodiment of this disclosure.

FIG. 9 illustrates an example process flow 900 that can facilitate multi-threaded migration, in accordance with an embodiment of this disclosure. In some examples, one or more embodiments of process flow 900 can be implemented by multi-threaded migration component 108 of FIG. 1, or computing environment 1600 of FIG. 16.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 500 of FIG. 5, process flow 600 of FIG. 6, process flow 700 of FIG. 7, process flow 800 of FIG. 8, process flow 1000 of FIG. 10, process flow 1100 of FIG. 11, process flow 1200 of FIG. 12, process flow 1300 of FIG. 13, process flow 1400 of FIG. 14, and/or process flow 1500 of FIG. 15.

Process flow 900 begins with 902, and moves to operation 904.

Operation 904 depicts receiving a request on a first key. This can comprise receiving a request to access a data object identified by the first key.

After operation 904, process flow 900 moves to operation 906.

Operation 906 depicts determining that the selected key-value store is the first key-value store or the second key-value store where the progress key is less than the first key. That is, while a migration is occurring, a determination can be made on whether to service the request with the legacy key-value store 110 (the first key-value store) or the new key-value store 112, using the example of FIG. 1. Where the progress key indicates that the first key has not yet been migrated from legacy key-value store 110 to new key-value store 112, then legacy key-value store 110 and new key-value store 112 can be selected to service the request.

After operation 906, process flow 900 moves to 908, where process flow 900 ends.

Figure 10:
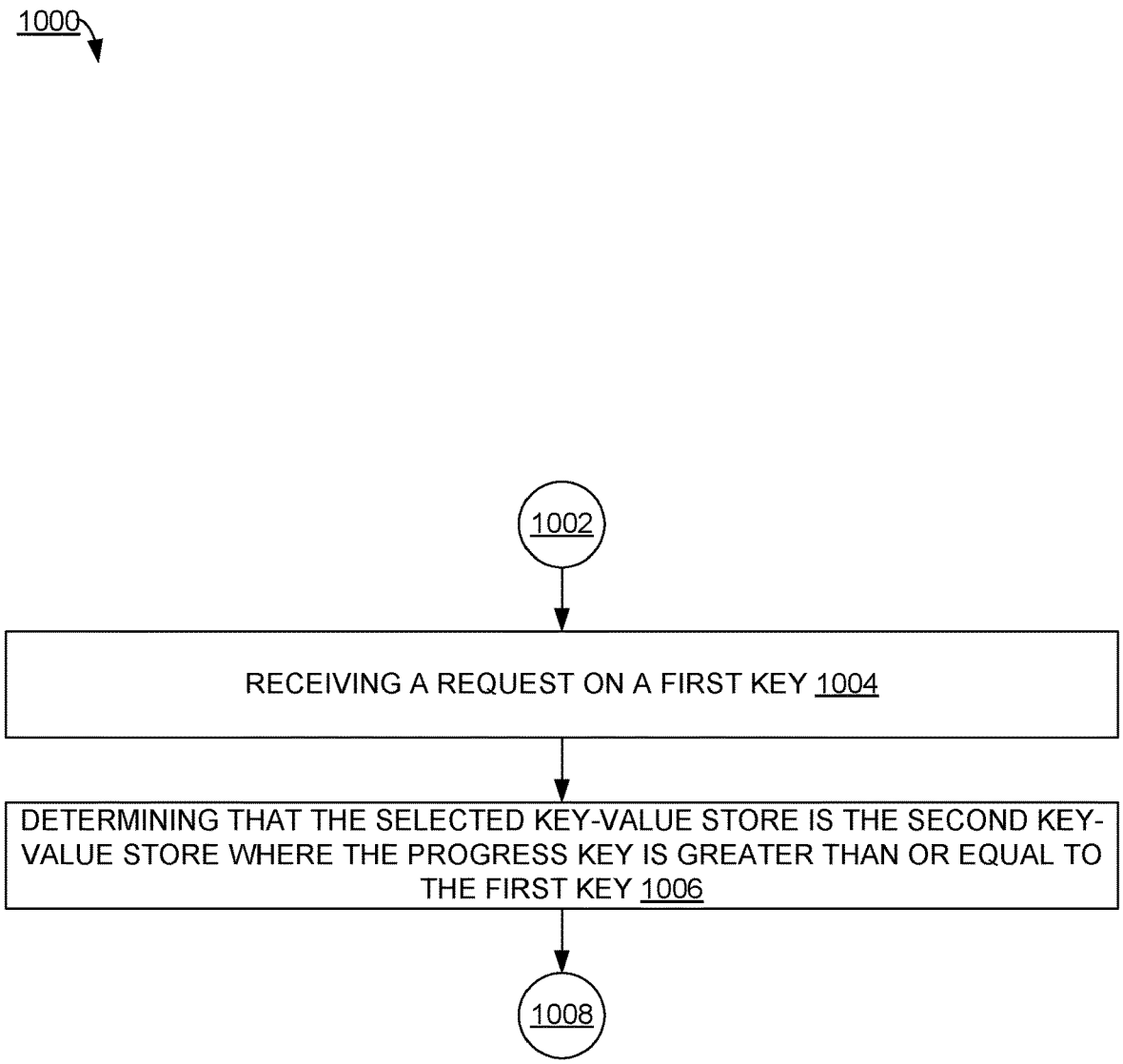
FIG. 10 illustrates another example process flow that can facilitate multi-threaded migration, in accordance with an embodiment of this disclosure.

FIG. 10 illustrates an example process flow 1000 that can facilitate multi-threaded migration, in accordance with an embodiment of this disclosure. In some examples, one or more embodiments of process flow 1000 can be implemented by multi-threaded migration component 108 of FIG. 1, or computing environment 1600 of FIG. 16.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 500 of FIG. 5, process flow 600 of FIG. 6, process flow 700 of FIG. 7, process flow 800 of FIG. 8, process flow 900 of FIG. 9, process flow 1100 of FIG. 11, process flow 1200 of FIG. 12, process flow 1300 of FIG. 13, process flow 1400 of FIG. 14, and/or process flow 1500 of FIG. 15.

Process flow 1000 begins with 1002, and moves to operation 1004.

Operation 1004 depicts receiving a request on a first key. This can comprise receiving a request to access a data object identified by the first key.

After operation 1004, process flow 1000 moves to operation 1006.

Operation 1006 depicts determining that the selected key-value store is the second key-value store where the progress key is greater than or equal to the first key. That is, while a migration is occurring, a determination can be made on whether to service the request with the legacy key-value store 110 (the first key-value store) or the new key-value store 112, using the example of FIG. 1. Where the progress key indicates that the first key has already been migrated from legacy key-value store 110 to new key-value store 112, then new key-value store 112 can be selected to service the request.

After operation 1006, process flow 1000 moves to 1008, where process flow 1000 ends.

FIG. 11 illustrates an example process flow 1100 that can facilitate multi-threaded migration, in accordance with an embodiment of this disclosure. In some examples, one or more embodiments of process flow 1100 can be implemented by multi-threaded migration component 118 of FIG. 1, or computing environment 1600 of FIG. 16.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 500 of FIG. 5, process flow 600 of FIG. 6, process flow 700 of FIG. 7, process flow 800 of FIG. 8, process flow 900 of FIG. 9, process flow 1000 of FIG. 10, process flow 1200 of FIG. 12, process flow 1300 of FIG. 13, process flow 1400 of FIG. 14, and/or process flow 1500 of FIG. 15.

Process flow 1100 begins with 1102, and moves to operation 1104.

Operation 1104 depicts maintaining a third key-value store. This third key-value store can be a navigable map.

After operation 1104, process flow 1100 moves to operation 1106.

Operation 1106 depicts utilizing the respective starting keys as respective keys to the third key-value store. That is, the start key of a bucket can be used as a key in the navigable map.

After operation 1106, process flow 1100 moves to operation 1108.

Operation 1108 depicts utilizing the respective buckets as respective values to the third key-value store. That is, a bucket that corresponds to the start key of operation 1106 can be used as a value in the navigable map.

After operation 1108, process flow 1100 moves to 1110, where process flow 1100 ends.

Figure 12:
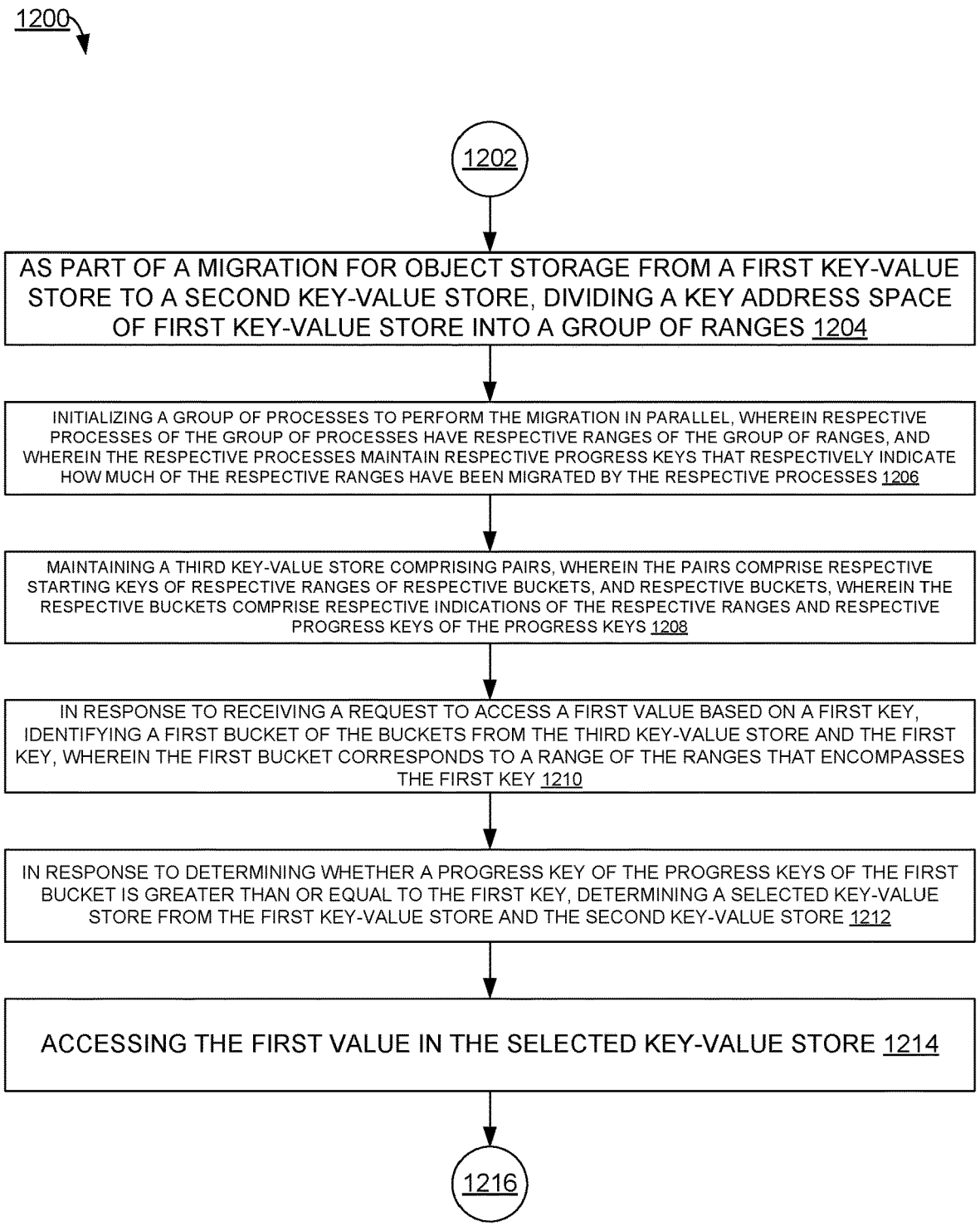
FIG. 12 illustrates another example process flow that can facilitate multi-threaded migration, in accordance with an embodiment of this disclosure.

FIG. 12 illustrates an example process flow 1200 that can facilitate multi-threaded migration, in accordance with an embodiment of this disclosure. In some examples, one or more embodiments of process flow 1200 can be implemented by multi-threaded migration component 128 of FIG. 1, or computing environment 1600 of FIG. 16.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 500 of FIG. 5, process flow 600 of FIG. 6, process flow 700 of FIG. 7, process flow 800 of FIG. 8, process flow 900 of FIG. 9, process flow 1000 of FIG. 10, process flow 1100 of FIG. 11, process flow 1300 of FIG. 13, process flow 1400 of FIG. 14, and/or process flow 1500 of FIG. 15.

Process flow 1200 begins with 1202, and moves to operation 1204.

Operation 1204 depicts, as part of a migration for object storage from a first key-value store to a second key-value store, dividing a key address space of first key-value store into a group of ranges. In some examples, operation 1204 can be implemented in a similar manner as operations 504-506 of FIG. 5.

After operation 1204, process flow 1200 moves to operation 1206.

Operation 1206 depicts initializing a group of processes to perform the migration in parallel, wherein respective processes of the group of processes have respective ranges of the group of ranges, and wherein the respective processes maintain respective progress keys that respectively indicate how much of the respective ranges have been migrated by the respective processes. In some examples, operation 1206 can be implemented in a similar manner as operation 508 of FIG. 5.

After operation 1206, process flow 1200 moves to operation 1208.

Operation 1208 depicts maintaining a third key-value store comprising pairs, wherein the pairs comprise respective starting keys of respective ranges of respective buckets, and respective buckets, wherein the respective buckets comprise respective indications of the respective ranges and respective progress keys of the progress keys. In some examples, operation 1208 can be implemented in a similar manner as operation 510 of FIG. 5.

After operation 1208, process flow 1200 moves to operation 1210.

Operation 1210 depicts, in response to receiving a request to access a first value based on a first key, identifying a first bucket of the buckets from the third key-value store and the first key, wherein the first bucket corresponds to a range of the ranges that encompasses the first key. In some examples, operation 1210 can be implemented in a similar manner as operation 512 of FIG. 5.

After operation 1210, process flow 1200 moves to operation 1212.

Operation 1212 depicts, in response to determining whether a progress key of the progress keys of the first bucket is greater than or equal to the first key, determining a selected key-value store from the first key-value store and the second key-value store. In some examples, operation 1212 can be implemented in a similar manner as operation 512 of FIG. 5.

After operation 1212, process flow 1200 moves to operation 1214.

Operation 1214 depicts accessing the first value in the selected key-value store. In some examples, operation 1214 can be implemented in a similar manner as operation 512 of FIG. 5.

In some examples, operation 1214 comprises serving requests to the object storage while performing the migration from the first key-value store to the second key-value store. That is, a live migration can be performed.

In some examples, the requests are first requests, and operation 1214 comprises, after the migration from the first key-value store to the second key-value store is completed, serving second requests to the object storage via the second key-value store, and independently of the first key-value store. That is, using the example of FIG. 1, a migration can completed be from legacy key-value store 110 to new key-value store 112.

After operation 1214, process flow 1200 moves to 1216, where process flow 1200 ends.

FIG. 13 illustrates an example process flow 1300 that can facilitate multi-threaded migration, in accordance with an embodiment of this disclosure. In some examples, one or more embodiments of process flow 1300 can be implemented by multi-threaded migration component 138 of FIG. 1, or computing environment 1600 of FIG. 16.

It can be appreciated that the operating procedures of process flow 1300 are example operating procedures, and that there can be embodiments that implement more or fewer operating procedures than are depicted, or that implement the depicted operating procedures in a different order than as depicted. In some examples, process flow 1300 can be implemented in conjunction with one or more embodiments of one or more of process flow 500 of FIG. 5, process flow 600 of FIG. 6, process flow 700 of FIG. 7, process flow 800 of FIG. 8, process flow 900 of FIG. 9, process flow 1000 of FIG. 10, process flow 1100 of FIG. 11, process flow 1200 of FIG. 12, process flow 1400 of FIG. 14, and/or process flow 1500 of FIG. 15.

Process flow 1300 begins with 1302, and moves to operation 1304.

Operation 1304 depicts determining, from the first key, a greatest key stored in the third key-value store that is less than or equal to the first key. The third key-value store can be a navigable map. A request can be made for "get floor entry," which can return a greatest key from the navigable map that is less than or equal to the query key.

After operation 1304, process flow 1300 moves to operation 1306.

Operation 1306 depicts identifying the first bucket based on the greatest key. That is, "get query key" can be utilized to identify a bucket based on this greatest key.

After operation 1306, process flow 1300 moves to 1308, where process flow 1300 ends.

Figure 14:
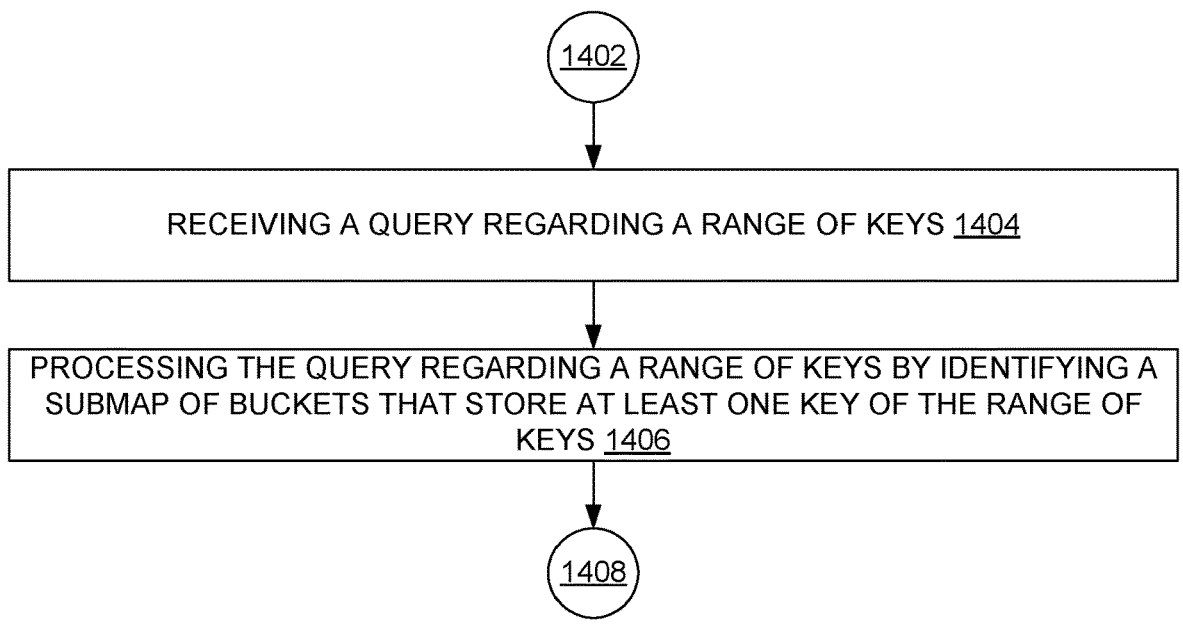
FIG. 14 illustrates another example process flow that can facilitate multi-threaded migration, in accordance with an embodiment of this disclosure.

FIG. 14 illustrates an example process flow 1400 that can facilitate multi-threaded migration, in accordance with an embodiment of this disclosure. In some examples, one or more embodiments of process flow 1400 can be implemented by multi-threaded migration component 148 of FIG. 1, or computing environment 1600 of FIG. 16.

It can be appreciated that the operating procedures of process flow 1400 are example operating procedures, and that there can be embodiments that implement more or fewer operating procedures than are depicted, or that implement the depicted operating procedures in a different order than as depicted. In some examples, process flow 1400 can be implemented in conjunction with one or more embodiments of one or more of process flow 500 of FIG. 5, process flow 600 of FIG. 6, process flow 700 of FIG. 7, process flow 800 of FIG. 8, process flow 900 of FIG. 9, process flow 1000 of FIG. 10, process flow 1100 of FIG. 11, process flow 1200 of FIG. 12, process flow 1300 of FIG. 13, and/or process flow 1500 of FIG. 15.

Process flow 1400 begins with 1402, and moves to operation 1404.

Operation 1404 depicts receiving a query regarding a range of keys. This query can regard whether the range of keys has been migrated.

After operation 1404, process flow 1400 moves to operation 1406.

Operation 1406 depicts processing the query regarding a range of keys by identifying a submap of buckets that store at least one key of the range of keys. That is, a submap can be retrieved with a start key and end key of the query range, and this can return the buckets of that range.

After operation 1406, process flow 1400 moves to 1408, where process flow 1400 ends.

FIG. 15 illustrates an example process flow 1500 that can facilitate multi-threaded migration, in accordance with an embodiment of this disclosure. In some examples, one or more embodiments of process flow 1500 can be implemented by multi-threaded migration component 158 of FIG. 1, or computing environment 1600 of FIG. 16.

It can be appreciated that the operating procedures of process flow 1500 are example operating procedures, and that there can be embodiments that implement more or fewer operating procedures than are depicted, or that implement the depicted operating procedures in a different order than as depicted. In some examples, process flow 1500 can be implemented in conjunction with one or more embodiments of one or more of process flow 500 of FIG. 5, process flow 600 of FIG. 6, process flow 700 of FIG. 7, process flow 800 of FIG. 8, process flow 900 of FIG. 9, process flow 1000 of FIG. 10, process flow 1100 of FIG. 11, process flow 1200 of FIG. 12, process flow 1300 of FIG. 13, and/or process flow 1500 of FIG. 15.

Process flow 1500 begins with 1502, and moves to operation 1504.

Operation 1504 depicts receiving a query that indicates determining whether a range of keys is migrated to the second key-value store. This can be similar to operation 1404 of FIG. 14. This can also be implemented in a similar manner as described with respect to FIG. 4.

After operation 1504, process flow 1500 moves to operation 1506.

Operation 1506 depicts determining that the range of keys is migrated based on determining, for each bucket of the submap of buckets, that keys of the bucket have been migrated. That is, it can be determined that a query range has been migrated where it is determined that each bucket in the range has been migrated.

After operation 1506, process flow 1500 moves to 1508, where process flow 1500 ends.

Example Operating Environment

In order to provide additional context for various embodiments described herein, FIG. 16 and the following discussion are intended to provide a brief, general description of a suitable computing environment 1600 in which the various embodiments of the embodiment described herein can be implemented.

For example, parts of computing environment 1600 can be used to implement one or more embodiments of computer system 102 and/or client computer 106.

In some examples, computing environment 1600 can implement one or more embodiments of the signal flows of FIGS. 5-15 to facilitate multi-threaded migration.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16, the example environment 1600 for implementing various embodiments described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system (BIOS) can be stored in a nonvolatile storage such as ROM, erasable programmable read only memory (EPROM), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive (HDD) 1614 (e.g., EIDE, SATA), one or more external storage devices 1616 (e.g., a magnetic floppy disk drive (FDD) 1616, a memory stick or flash drive reader, a memory card reader, etc.) and an optical disk drive 1620 (e.g., which can read or write from a CD-ROM disc, a DVD, a BD, etc.). While the internal HDD 1614 is illustrated as located within the computer 1602, the internal HDD 1614 can also be configured for external use in a suitable chassis (not shown). Additionally, while not shown in environment 1600, a solid state drive (SSD) could be used in addition to, or in place of, an HDD 1614. The HDD 1614, external storage device(s) 1616 and optical disk drive 1620 can be connected to the system bus 1608 by an HDD interface 1624, an external storage interface 1626 and an optical drive interface 1628, respectively. The interface 1624 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally comprise emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can comprise one virtual machine (VM) of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1602, e.g., applied at the application execution level or at the operating system (OS) kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1394 serial port, a game port, a USB port, an IR interface, a BLUETOOTH® interface, etc.

A monitor 1646 or other type of display device can be also connected to the system bus 1608 via an interface, such as a video adapter 1648. In addition to the monitor 1646, a computer typically includes other peripheral output devices (not shown), such as speakers, printers, etc.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/wireless connectivity to a local area network (LAN) 1654 and/or larger networks, e.g., a wide area network (WAN) 1656. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1654 through a wired and/or wireless communication network interface or adapter 1658. The adapter 1658 can facilitate wired or wireless communication to the LAN 1654, which can also include a wireless access point (AP) disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the Internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/storage device 1652. It will be appreciated that the network connections shown are examples, and other means of establishing a communications link between the computers can be used.

When used in either a LAN or WAN networking environment, the computer 1602 can access cloud storage systems or other network-based storage systems in addition to, or in place of, external storage devices 1616 as described above. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   at least one memory that stores executable instructions that, when executed by the at least one processor, facilitate performance of operations, comprising:
   initiating a migration for object storage from a first key-value store to a second key-value store;
   dividing a key address space of the first key-value store into a group of ranges, wherein the ranges of the group of ranges are continuous and nonoverlapping, and wherein the key address space is ordered based on respective key values;
   initializing a group of processes to perform the migration in parallel, wherein respective processes of the group of processes have respective ranges of the ranges, and wherein the respective processes maintain respective progress keys that respectively indicate how much of the respective ranges have been migrated by the respective processes;
   maintaining a navigable map comprising pairs,
   wherein the pairs comprise respective starting keys of respective ranges of respective buckets, and respective buckets, and
   wherein the respective buckets comprise respective indications of the respective ranges and respective progress keys of the progress keys; and in response to receiving a request to access a first value based on a first key,
   identifying a first bucket of the respective buckets from the navigable map and the first key, wherein the first bucket corresponds to a range of the ranges that encompasses the first key, and
   in response to determining that a progress key of the progress keys of the first bucket is greater than or equal to the first key, accessing the first value in the second key-value store.

2. The system of claim 1, wherein the operations further comprise:
   in response to determining that the progress key is less than the first key, attempting to first access the first value in the second key-value store, and where the first key does not exist in the second key-value store, accessing the first value in the first key-value store.

3. The system of claim 1, wherein the operations further comprise:
   refusing new write operations to the first key-value store after initiating the migration.

4. The system of claim 1, wherein respective processes of the group of processes each migrate a different respective range of the respective ranges.

5. The system of claim 1, wherein the respective progress keys indicate a last key that was successfully migrated by a corresponding process of the group of processes.

6. The system of claim 1, wherein respective processes of the group of processes perform iterations of listing keys from the first key-value store, and wherein performing the iterations of listing keys comprises updating the respective progress keys after the respective iterations of listing keys.

7. The system of claim 6, wherein the operations further comprise:
   periodically performing iterations of persisting respective states of the respective processes to the second key-value store, comprising using a process that is separate from the respective processes, wherein respective iterations of the listing keys correspond to respective iterations of the persisting.

8. A method, comprising:
as part of executing a migration for object storage from a first key-value store to a second key-value store, dividing, by a system comprising at least one processor, a key address space of the first key-value store into a group of ranges,
initializing, by the system, a group of processes to perform the migration concurrently, wherein respective processes of the group of processes have respective ranges of the ranges, and wherein the respective processes maintain respective progress keys that respectively indicate how much of the respective ranges have been migrated by the respective processes;
maintaining, by the system, a navigable map comprising pairs, wherein the pairs comprise respective starting keys of respective ranges of respective buckets and respective buckets, wherein the respective buckets comprise respective indications of the respective ranges and respective progress keys of the progress keys;
in response to receiving a request to access a first value based on a first key, identifying, by the system, a first bucket of the buckets from the navigable map and the first key, wherein the first bucket corresponds to a range of the ranges that contains the first key;
in response to determining whether a progress key of the progress keys of the first bucket is greater than the first key, determining, by the system, a selected key-value store from the first key-value store and the second key-value store; and
accessing, by the system, the first value in the selected key-value store.

9. The method of claim 8, wherein determining the selected key-value store from the first key-value store and the second key-value store comprises:
determining that the selected key-value store is the first key-value store or the second key-value store where the progress key is less than the first key.

10. The method of claim 8, wherein determining the selected key-value store from the first key-value store and the second key-value store comprises:
determining that the selected key-value store is the second key-value store where the progress key is greater than or equal to the first key.

11. The method of claim 8, wherein the navigable map comprises a third key-value store, and wherein maintaining the navigable map comprises:
utilizing the respective starting keys as respective keys to the third key-value store; and
utilizing the respective buckets as respective values to the third key-value store.

12. The method of claim 8, wherein a first number of entries of the navigable map is equal to a second number of ranges in the group of ranges.

13. The method of claim 8, further comprising:
creating, by the system, an instance of the navigable map that is accessible by a key-value client process.

14. The method of claim 13, further comprising:
periodically refreshing, by the system, the instance of the navigable map.

15. A non-transitory computer-readable medium comprising instructions that, in response to execution, cause a system comprising at least one processor to perform operations, comprising:
as part of a migration for object storage from a first key-value store to a second key-value store, dividing a key address space of first key-value store into a group of ranges;
initializing a group of processes to perform the migration in parallel, wherein respective processes of the group of processes have respective ranges of the group of ranges, and wherein the respective processes maintain respective progress keys that respectively indicate how much of the respective ranges have been migrated by the respective processes;
maintaining a third key-value store comprising pairs, wherein the pairs comprise respective starting keys of respective ranges of respective buckets, and respective buckets, wherein the respective buckets comprise respective indications of the respective ranges and respective progress keys of the progress keys;
in response to receiving a request to access a first value based on a first key, identifying a first bucket of the buckets from the third key-value store and the first key, wherein the first bucket corresponds to a range of the ranges that encompasses the first key;
in response to determining whether a progress key of the progress keys of the first bucket is greater than or equal to the first key, determining a selected key-value store from the first key-value store and the second key-value store; and
accessing the first value in the selected key-value store.

16. The non-transitory computer-readable medium of claim 15, wherein identifying the first bucket of the buckets from the third key-value store and the first key comprises:
determining, from the first key, a greatest key stored in the third key-value store that is less than or equal to the first key; and
identifying the first bucket based on the greatest key.

17. The non-transitory computer-readable medium of claim 15, wherein the operations further comprise:
processing a query regarding a range of keys by identifying a submap of buckets that store at least one key of the range of keys.

18. The non-transitory computer-readable medium of claim 17, wherein the query indicates determining whether the range of keys is migrated to the second key-value store, and wherein the operations further comprise:
determining that the range of keys is migrated based on determining, for each bucket of the submap of buckets, that keys of the bucket have been migrated.

19. The non-transitory computer-readable medium of claim 15, wherein the operations further comprise:
serving requests to the object storage while performing the migration from the first key-value store to the second key-value store.

20. The non-transitory computer-readable medium of claim 15, wherein the requests are first requests, and wherein the operations further comprise:
after the migration from the first key-value store to the second key-value store is completed, serving second requests to the object storage via the second key-value store, and independently of the first key-value store.

* * * * *